(12) United States Patent
Edvinsson

(10) Patent No.: US 11,602,890 B2
(45) Date of Patent: Mar. 14, 2023

(54) METHOD FOR PRINTING A 3D PRODUCT AND A 3D PRINTING DEVICE

(71) Applicant: L3F SWEDEN AB, Töreboda (SE)

(72) Inventor: Jerry Edvinsson, Töreboda (SE)

(73) Assignee: L3F SWEDEN AB

( * ) Notice: Subject to any disclaimer, the term of this patent is extended or adjusted under 35 U.S.C. 154(b) by 345 days.

(21) Appl. No.: 16/472,021

(22) PCT Filed: Jan. 3, 2017

(86) PCT No.: PCT/EP2017/050079
§ 371 (c)(1),
(2) Date: Jun. 20, 2019

(87) PCT Pub. No.: WO2018/127275
PCT Pub. Date: Jul. 12, 2018

(65) Prior Publication Data
US 2020/0016826 A1    Jan. 16, 2020

(51) Int. Cl.
*B29C 64/153* (2017.01)
*B29C 64/393* (2017.01)
*B29C 64/205* (2017.01)
*B33Y 10/00* (2015.01)
*B33Y 30/00* (2015.01)
*B33Y 80/00* (2015.01)

(52) U.S. Cl.
CPC ......... *B29C 64/153* (2017.08); *B29C 64/205* (2017.08); *B29C 64/393* (2017.08); *B29K 2995/0097* (2013.01); *B33Y 10/00* (2014.12); *B33Y 30/00* (2014.12); *B33Y 80/00* (2014.12)

(58) Field of Classification Search
CPC ....... B29C 64/205; B33Y 10/00; B33Y 30/00; B33Y 80/00; B29K 2995/0097
See application file for complete search history.

(56) References Cited

U.S. PATENT DOCUMENTS

| 5,192,469 A | 3/1993 | Smalley et al. |
| 2015/0125657 A1* | 5/2015 | Knestel ............ G01M 17/0074 428/141 |

(Continued)

FOREIGN PATENT DOCUMENTS

| WO | 0172502 A1 | 10/2001 |
| WO | 2014199231 A2 | 12/2014 |
| WO | WO-2014199231 A2 * | 12/2014 ......... B29C 67/0059 |

OTHER PUBLICATIONS

International Preliminary Report including the Written Opinion from PCT/EP2017/050079 dated Mar. 25, 2019.

(Continued)

*Primary Examiner* — Yung-Sheng M Tsui
*Assistant Examiner* — Melody Tsui
(74) *Attorney, Agent, or Firm* — Lerner, David, Littenberg, Krumholz & Mentlik, LLP

(57) ABSTRACT

The present disclosure relates to a method for manufacturing one or more 3D products by additive manufacturing using a layer-by-layer technique and a 3D printing device. The method comprises the steps of; setting a first thickness of a reference layer and forming one or more material layer having a second thickness. The second thickness is set as a multiple of an integer and said first thickness of the reference layer, and performing a binding action on said material layer.

16 Claims, 9 Drawing Sheets

(56) References Cited

U.S. PATENT DOCUMENTS

| | | | |
|---|---|---|---|
| 2016/0107387 A1* | 4/2016 | Ooba | B29C 64/165 |
| | | | 425/130 |
| 2016/0318251 A1* | 11/2016 | Ederer | B29C 64/165 |
| 2017/0008232 A1* | 1/2017 | Bruch Pla | B29C 64/153 |
| 2017/0021454 A1* | 1/2017 | Dallarosa | B22F 10/366 |
| 2019/0240898 A1* | 8/2019 | Chaffins | C08K 3/22 |

OTHER PUBLICATIONS

International Search Report from PCT/EP2017/050079 dated Aug. 31, 2017, 3 pages.

* cited by examiner

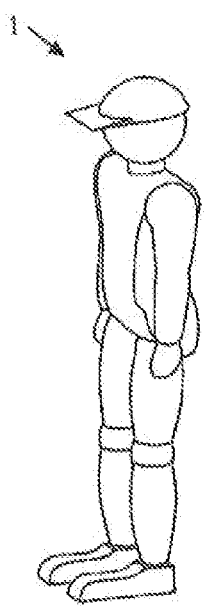
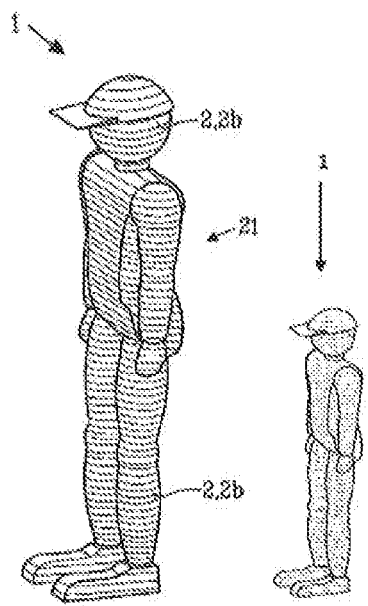
Fig 1a  Fig 1b

METHOD FOR PRINTING A 3D PRODUCT AND A 3D PRINTING DEVICE

TECHNICAL FIELD

A method for manufacturing one or more 3D products in one batch by additive manufacturing using a layer-by-layer technique and a 3D printing device for manufacturing one or more 3D products in one batch by additive manufacturing using a layer-by-layer technique.

BACKGROUND

Additive manufacturing techniques comprises a process involving putting together or combining materials in order to manufacture 3D products from 3D modeling data, typically a computer-assisted design file, usually layer by layer, as opposed to subtractive manufacturing methodologies, such as traditional machining. These elementary volume elements, denoted "voxels", may be created and juxtaposed using a variety of different technical principles, for example by providing drops of photopolymerizable monomers by means of a print head, by selectively photopolymerizing with a source of UV light near the surface of a bath of monomer (stereolithography technique), or by melting polymer powder (selective laser melting (SLM) or selective laser sintering (SLS)) to mention a few.

Additive manufacturing techniques allow the geometry of 3D products to be defined with a great deal of flexibility, but raise a number of problems. In some fields, there is a need to be able to manufacture relatively large and geometrically complicated products and at a low cost. In other fields, care has been taken to manufacture small products even down to micro scale or nano scale.

Independently of the field, the manufacturing time may have a significant impact on the costs. To reduce the manufacturing time efforts has been made to print continuous products showing substantially no distinct layers. Such manufacturing methods enabling the printing of such 3D products may have the advantage of not being restricted to position the 3D model in a specific way with respect to the printing volume.

It appears however that many of the additive manufacturing methods are further restricted to manufacture of one product at a time. There are several drawbacks with this for obvious reasons. One reason is of course that if it is possible to manufacture two products in one batch, the manufacturing time will be significantly reduced. However, once it has been realized that two or more products are to be produced in a single batch, other problems arises.

SUMMARY

It is an object of the invention to provide a method for manufacturing a 3D product which permits an operator to control the resolution of one or more 3D products during manufacturing. This object is at least partly achieved by means of providing a method according to claim 1. This object is at least partly achieved by means of a method for manufacturing one or more 3D products by additive manufacturing using a layer-by-layer technique. The method comprised the steps of; setting a first thickness of a reference layer and forming one or more material layers having a second thickness. The second thickness is set as a multiple of an integer and the first thickness of the reference layer. The method further comprises performing a binding action on the material layer.

The binding action and application of the one or more material layers are repeated until the one or more 3D products are formed. The method provides for a flexible method which permits individual control of the resolution for each 3D product in a simple and effective manner. The method enables at least two 3D products to be manufactured with different resolution in the same batch, hence it is not necessary to choose between high resolution, i.e. a high number of relatively thin material layers, and a fast manufacturing time which may be achieved by using relatively thick material layers. By controlling the thickness of the material layers, the ratio of binding agent and bulk material may be governed. The porosity and the weight of the final 3D products can thus be manipulated. Just as a matter of example, less binding agent may give lighter but more brittle 3D products which sometimes may be acceptable. If stronger products are desirable, binding agent may be applied more frequently. If the first thickness of the reference layer is $T_r$ and the integer is n, then the multiple of the first thickness of the reference layer and the integer is $n \cdot T_r$. The setting of a first thickness of a reference layer is preferably done in a control unit for a 3D printing device which may be locally or remotely arranged with respect to the 3D printing device. The manufacturing of one or more 3D products may be performed in one single batch, or using a continuous building process. A suitable batch size is preferably 1 $m^3$ or more, such as 2 $m^3$ or more, 3 $m^3$ or more, 4 $m^3$ or more, preferably 5 $m^3$ or more.

The integer may be from 1, 2, 3, 4, 5, 6, 7, 8, 9, 10 or more, preferably 1-10, more preferably within the range of 1-10 000, 1-5000, 1-1000, 1-100. In an embodiment, the integer is >1. The integer 1 may thus be excluded, or in other words, in an embodiment the integer may be 2, 3, 4, 5, 6, 7, 8, 9, 10 or more, preferably within the range of 2-10, 2-10 000, 2-5000, 2-1000, 2-100. By using a lowest common denominator, i.e. the thickness of the reference layer, when selecting the thickness of the material layers in the batch, 3D products having different resolution may easily be manufactured, faster and at lower costs. It should be noted that the thickness of the reference layer may be selected to be larger than the thinnest material layer possible for the device which is used for manufacturing. In fact this may be preferably as in some aspects; some devices for additive manufacturing may be operated to make large products or products having low demand on resolution, i.e. no need for a high resolution.

By means of the method and the device disclosed herein two or more products may be manufactured simultaneously in one batch. A first 3D product in the batch may be at least partly formed by material layers having the first thickness, and whereby a second 3D product in the batch may be at least partly formed by material layers having the second thickness. Two or more products may thus be formed having different thickness of the material layers before a binding action is performed.

According to an aspect, the first thickness of the reference layer may be set as a minimal thickness available for a material layer. In this setting, the selected thickness of the reference layer is the smallest available thickness thus defining the highest resolution available for a 3D product in the specific batch.

The first thickness of the reference layer may be within the range of from 0.001-20, optionally 0.01-20 mm, optionally 0.05-10 mm, optionally 0.05-5 mm, optionally 0.1-1.0 mm. The thickness of the reference layer may be selected to be thinner, equal or thicker than the minimum available material layer thickness.

The material layer may be formed by applying one or more layers of bulk material. A material layer, as referred to herein, refers to the material layer before the binding action has been performed. Hence if measuring for comparative purposes, the measurements and comparisons should be performed before binding action is performed. After every cycle a binding action has been performed at a selected section, a new material layer is thus applied at that selected section.

The method may be a method for printing at least a first and a second 3D product in a single batch. It has been found that the method is especially advantageous for printing two or more 3D products in one single batch. The method permits the resolution to be controlled for the individual products.

The binding action may be heat treatment, radiation treatment, light treatment, application of binding agent, application of chemical reactant, or combinations thereof. A preferred binding action is to apply binding agent.

The batch may be separated into at least a first and a second zone, whereby in the first zone a material layer having a first thickness is formed and a binding action is subsequently performed, and whereby in the second zone a material layer having the second thickness is formed before a binding action is subsequently performed.

According to an aspect, the method may comprise providing an image on an image displaying unit representative of at least a portion of the printing volume of the batch. Partitioning the image into at least a first and a second zone. The first and the second zones each defines boundaries within which zones at least one process parameter governs said partitioned available 3D printing volume. The process parameter may in this case be different material layer thicknesses. Hence in one zone a first material layer thickness is selected, and in a second zone a second material layer is selected, the second thickness being set as a multiple of an integer and the first thickness of the reference layer. Just as matter of example, the same X-Y plane may be provided with different multiples. As such, different 3D products may be printed having different resolution but still sharing the same X-Y plane. This provides for a very efficient and flexible manufacturing method and device.

In general terms, the method may comprise a step to perform a binding action, such as to add binding agent, on a material layer having a first thickness and on a material layer having a second thickness within one and the same run, or 'cycle', such as within one and the same run of the layer bonding unit for depositing binding agent or bind the layer in any other suitable way. Just as a matter of example, if a depositing unit cycles from left to right while depositing binding agent, binding agent will be applied on a material layer having a first thickness on a first 3D products and on a material layer having a second thickness on a second 3D product as the depositing unit travels from left to right. Instead of left to right it is of course possible to go from right to left, i.e. from a first side to an opposing second side. Generally such depositing unit travels back and forth along the X axis.

According to an aspect, the method is a method for controlling the resolution on the one or more 3D products.

According to an aspect, step a) is set as a memorized value, e.g. in a control unit. The thickness of the reference layer may be stored and retrieved e.g. each time the device is started, e.g. during a startup phase or upon request by an operator. While the step of applying material layers and performing a binding action are repeated, it is thus not necessary for an operator to set thickness of the reference layer more than once. It may be enough to set the thickness of the reference layer once for each batch for example.

According to an aspect, a first material layer having a second thickness may be formed, and a second material layer having a third thickness may be formed. The third thickness is a multiple of an integer and the first thickness of the reference layer. It may thus be possible to manufacture one or more 3D products in which none of the 3D products has a material layer corresponding to the thickness of the reference layer. This provides flexibility to the manufacturing method and may also enable increased manufacturing speed.

The first and the second material layers may be formed within one 3D product. It is thus possible to manufacture a single 3D product having two different material layer thickness. This provides the possibility to evaluate the impact of different material thicknesses in one batch, and by printing one single 3D product.

It is also possible, as an option or in addition, that the first and the second material layers are formed within in at least two different 3D products. This provides the possibility to evaluate the impact of different material thicknesses and/or different amounts of binding agent as example, in one batch by printing two distinct 3D products.

According to an aspect, the one or more material layer may be formed by a particulate material, and optionally the thickness of said reference layer may be selected based on particle size on the particulate material. The particulate material may be a single particulate material or a mixture of different particulate materials.

According to an aspect, in step b) forming of the material layer comprises levelling out the material layer. The second thickness of the material layer is determined after the material layer has been levelled out. The method is applicable on different kinds of material used of forming the material layer. Some material may not need levelling out, while other materials may benefit from being levelled out. Incorporating a levelling out step in which the material layer is smoothen out to provide a flat and uniform surface may enable an improved binding action.

According to an aspect, the thickness of the reference layer may be defined as a levelled out material layer. The reference layer may thus be defined as a levelled out material layer.

The material layer may be levelled out using a fixed blade such as a scraper, and/or, a rotating element such as rotating brush, rotating cylinder, vibrator.

The objective is further at least partly met by a 3D printing device for manufacturing one or more 3D products in a single batch by additive manufacturing using a layer-by-layer technique. The 3D printing device comprises a layer applying unit for applying one or more layers of bulk material, a layer bonding unit for binding a selected portion of the applied one or more bulk material layers so as to form a 3D product, and a control unit to control at least one process parameter. The control unit is configured to set a first thickness of a reference layer. The 3D printing device is further adapted to form a material layer having a second thickness, the second thickness is set as a multiple of an integer and the first thickness of the reference layer.

The binding action and application of the material layers are repeated until the one or more 3D products are formed. The device enables individual control of the resolution for 3D products in a simple and effective manner. The device enables at least two 3D products to be manufactured with different resolution in the same batch, hence it is not necessary to choose between high resolution, i.e. a high number of relatively thin material layers, and a fast manufacturing time which may be achieved by using relatively thick material layers. The device also enables By controlling the thickness of the material layers, the ratio of binding agent and bulk material may be governed. The porosity and the weight of the final 3D products can thus be manipulated. Just as a matter of example, less binding agent may give lighter but more brittle 3D products which sometimes may be acceptable. If stronger products are desirable, binding agent may be applied more frequently and/or at higher concentrations.

The material layer may be formed by one or more bulk material layers, preferably by particulate material.

Also disclosed herein is a 3D printed product formed by a plurality of material by additive manufacturing using a layer-by-layer technique. The material layers has at least a first and a second thickness. The second thickness is a multiple of an integer and the first thickness, wherein the integer is >1.

According to an aspect, the disclosure also relates to a computer program comprising program code means for performing the steps according to the method disclosed herein, when the program is run on a computer.

According to an aspect, the disclosure also relates to a computer readable medium carrying a computer program comprising program code means for performing the method disclosed herein when the program product is run on a computer.

It should be noted that features disclosed with respect to the method may also be applicable on the device and features disclosed with respect to the device may also be applicable on the method.

This may concern products for direct use, such as building elements, ornamental mouldings, etc., as well as moulds and prototypes for the production of other products.

BRIEF DESCRIPTION OF THE DRAWINGS

Non-limiting embodiments will be described in greater detail with reference to the accompanying figures in which;

FIGS. 1a and 1b show 3D models in the form of a doll illustrating the option to print similar 3D products having different resolution in a single batch;

DETAILED DESCRIPTION OF PREFERRED EMBODIMENTS

Figure 2:
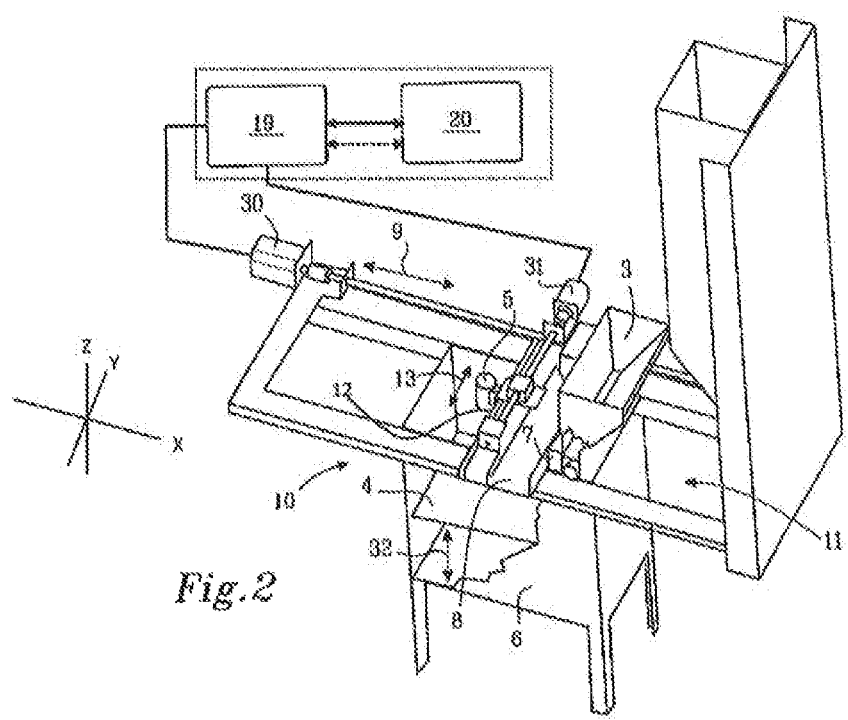
FIG. 2 a schematic view of a 3D printing device for additive manufacturing.

The expression "additive manufacturing" is herein meant, according to international standard ASTM 2792-12, manufacturing techniques comprising a process involving putting together or combining materials in order to manufacture 3D products from 3D modeling data such as a computer-assisted design file e.g. CAD, usually layer by layer, as opposed to subtractive manufacturing methodologies, such as traditional machining. The additive manufacturing method disclosed herein is preferably a binder jetting method in which bonding agent, preferably liquid bonding agent, is selectively deposited onto a particulate material to join the particulate material. Other additive manufacturing methods which may benefit from the present disclosure are powder bed fusion, directed energy deposition, material extrusion, vat photopolymerization, material jetting or sheet lamination.

Embodiments of the present disclosure will be described herein e.g. with reference to glass beads or wood powder as particulate material. It should be noted however that the method or device disclosed herein is not limited to wood powder or glass beads, or even particulate material, as such.

With reference to FIGS. 1a-1b, the method according to the disclosure for manufacturing one or more 3D products in one batch by means of additive manufacturing using a layer-by-layer technique will be described in greater detail. The method includes that a layer of wood powder is applied onto a support, that binding agent is deposited onto the wood powder layer, whereupon an additional layer of wood powder is applied onto the preceding wood powder layer. Such application of wood powder and such deposition of binding agent are alternately repeated a desired number of times, so that wood powder of each layer and of adjacent layers is bonded into a continuous product by means of the binding agent.

FIG. 1a illustrates an example of a model 1 in the form of a doll and FIG. 1b schematically illustrates how the model 1 has been divided into horizontally oriented slices 2. Accordingly, the model exists as 3D modelling data, e.g. in a CAD file, in a computer program. The computer-based model 1 is then used as input data to a control unit of the device according to the disclosure in order to create a substantially similar real 3D product, in the example a doll, consisting of wood powder and binding agent. The basics of a suitable layer-by-layer technique are disclosed in the international patent application no. WO2006033621A1 assigned to L3F and will not be described in detail herein.

The layers 2b corresponding to the slices 2 of the model will be more difficult to distinguish in the real product 21 especially if thinner layers are used for building up the product. Hence, with thinner layers comes a higher resolution. As is evident from FIG. 1b, the shape of the product is created by means of forming a plurality of layers, preferably more than 10 and usually more than 50, which can exhibit bonded areas of different sizes and different shapes, to overlap each other. Just as a matter of example, if a product which is 1 meter high is to be created from layers having a thickness of the order of 1 mm, approximately 1000 layers will be required.

The one or more 3D products may be manufactured batch wise, the batch having a printing volume. The printing volume is the available volume which can be used to manufacture 3D products. Just as a matter of example, if the printing volume is 1 m$^3$, a 3D product having a volume of 1 m$^3$ can be printed. As will be disclosed herein; a method according to the disclosure will enable the manufacturing of one or more 3D products, preferably two or more 3D products, having different layer thickness. The method comprising the steps of setting a first thickness of a reference layer and forming a material layer having a second thickness, the second thickness is set as a multiple of an integer and the said first thickness of the reference layer. A binding action may thereafter be performed on the material layer to form a 3D product. By means of the present disclosure, the resolution of the one or more 3D products can be manipulated such that the manufacturing method is both more cost effective and faster. Referring again to FIG. 1b, as can be noticed, the doll may thus be manufactured not only in different sizes, but also with different resolution, i.e. with different layer thickness. It is thus also possible to manufacture e.g. two dolls of equal size but having different resolution, i.e. with different layer thickness.

FIG. 2 illustrates a 3D printing device, hereafter only referred to as the device, for manufacturing one or more 3D products in a single batch by means of additive manufacturing using a layer-by-layer technique, in this case a continuous product of wood powder. The device includes a layer applying unit 3 for feeding out particulate material, in the shown embodiment wood powder, forming a material layer onto a support 4. A layer bonding unit 5, in this case a depositing unit 5 for performing a binding action, e.g. by depositing binding agent onto selected portions of the applied wood powder layer. The device according to embodiments herein may further comprise an optional reinforcing element application unit for application of reinforcing elements such as continuous reinforcing filaments e.g. nylon strings.

For the purpose of orientation, the height or vertical direction corresponds to a Z axis, the length, or longitudinal direction corresponds to a X axis, and the width, or transverse direction corresponds to a Y axis. The Z, X, Y axes are perpendicular to each other.

In the embodiment of the device according to the invention illustrated in FIG. 2, the device comprises a receptacle 6 (which, for reasons of clarity, is shown cut off at the front) inside which a base plate 4 also referred to as a support 4, being vertically adjustable along the Z axis and constituting said support, is arranged. It should be noted however that instead of having a vertically adjustable support, the support may be fixed and the other units may be adjustable in a vertical direction so as to enable the formation of material layers and the performing of a binding action. Just as a matter of example, the layer applying unit and the layer binding unit and optionally a levelling unit if such is present may be vertically adjustable with respect to the support.

At the upper end of the receptacle 6, the layer applying unit 3 (in the following called the feeder 3), the depositing unit 5 and an optional unit 7 for levelling the layer and/or for removing excessive wood powder are arranged on a movable carriage 8. The feeder 3 and the layer levelling unit 7 are arranged for reciprocating motion along at least the X axis, i.e. in a direction parallel to the base plate 4, for example from a first end 10 to a second end 11 of the receptacle 6 and vice versa. The depositing unit 5 which exhibits at least one nozzle 12, preferably a plurality of individual nozzles 12, for deposition of binding agent, should be arranged for displacement along the two axes X, Y, preferably in a plane parallel to the support 4, in order to enable deposition of binding agent onto desired areas. In principle, also a depositing means arranged for displacement along only one axis could be used, but this requires a depositing means which exhibits a large number of separate nozzles arranged along an axis being perpendicular in relation to the displacement axis of the depositing means. Other mechanisms for depositing binding agent may be used of course. Just as a matter of example, one or more robotic arms may be used such as one or more Cartesian robot arms. Different optional arrangements may be used to adapt the thickness of the bulk material layers such as a scraper and/or a rotating brush. An excessive bulk material removing unit may also be provided such as a suction and/or blowing device for transporting away excessive bulk material.

The levelling unit 7 may be operated to level out each applied layer, or to level out after a selected number or layers has been applied. Just as a matter of example and in general terms, the levelling unit may have one leveling cycle for each cycle of the layer applying unit. Optionally the levelling unit may have one cycle for every second cycle, or more, of the layer applying unit.

The device further comprises a control unit 19 operatively connected with a display unit 20. The display unit 20 may be remotely positioned with respect to the device and connected via wires or in a wireless manner e.g. via Wifi or via other communication protocols, or via a 3G, 4G or 5G network. The control unit 19 may include a computer provided with a program for converting one or more 3D models into signals, said signals being used for controlling different components of the device, such as the feeder 3, the depositing unit 5, the levelling unit 7 and the base plate 4. By means of transmitting these signals to motors 30, 31 being arranged for driving the mechanical components, the product according to the invention can be produced in an automatic way. As mentioned above, the control unit 19 and the display unit 20 may be arranged locally at the device or remotely thereto. A remote location is illustrated by the dashed box.

In the shown embodiment, binding agent is applied onto selected portions of a bulk material layer in order to form a specific geometry of the 3D product by means of distribution of binding agent. In the production, the portions where binding agent has been deposited will form the one or more 3D products, while remaining portions of the bulk material layers will remain unbonded, and thus not contribute to the finished one or more 3D products. However, before it is removed, the unbonded material can constitute a support for the 3D products during their manufacture.

Figure 3:
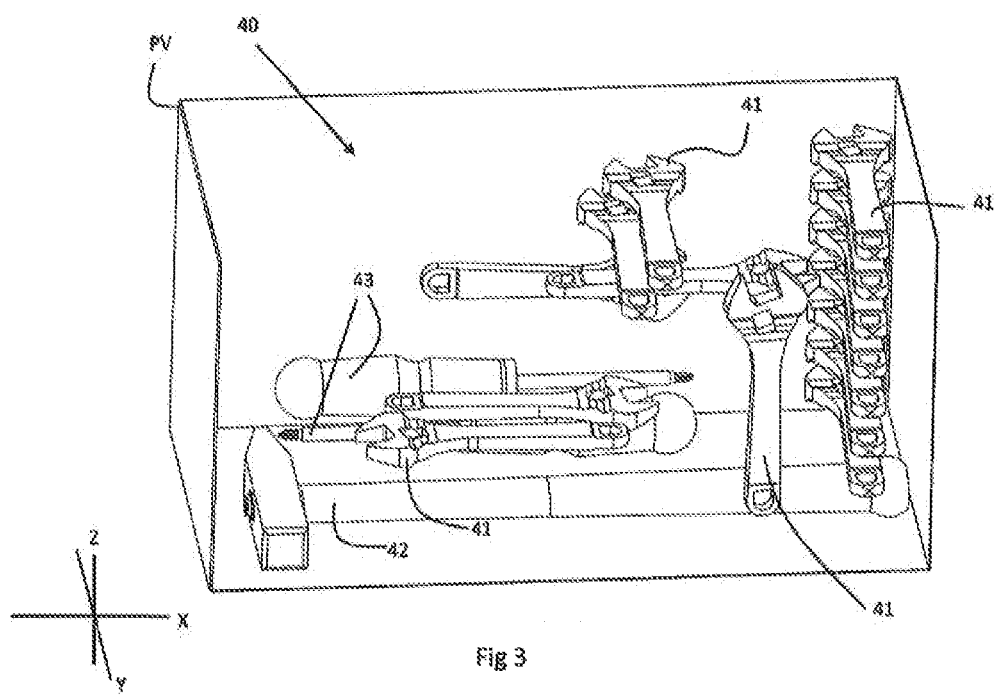
FIG. 3; a schematic view of the available printing volume in this case defined by a Cartesian coordinate system and selected 3D models to be printed, with a view in perspective.

FIG. 3 shows an illustration of how the 3D modelling data may be manipulated by a user and as represented on the display unit 20. FIG. 3 shows a virtual image of the batch representing the printing volume PV of the batch. A number of 3D models representing printable 3D products are visualized; a plurality of wrenches 41, a hammer 42 and a plurality of screw drivers 43.

Figure 4:
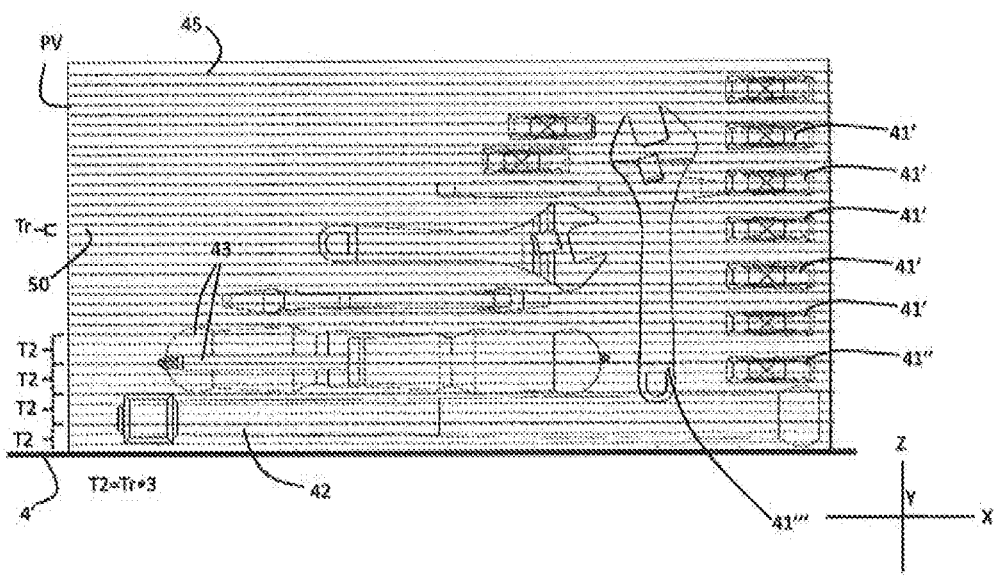
FIG. 4 a schematic view of the available printing volume with a view along the Y axis also illustrating the thickness of a reference layer and four material layers having a thickness set as a multiple of an integer and the thickness of a reference layer.

FIG. 4 shows the batch illustrated in FIG. 3 but with a view along the Y axis. Further illustrated in FIG. 4 are a plurality of virtual material layers illustrated by the dotted lines 45. The dotted lines 45 represent material layers as they could be applied on the support 4, visualized in FIG. 4 by the line 4'. Supporting walls to the support 4 are not illustrated in FIG. 4. Via the display unit 20, which functions as an operator interface, a user may set a thickness $T_r$, referred to as a first thickness $T_r$, of a reference layer 50. The reference layer 50 will thereafter serve as a reference for selecting a suitable resolution to any selected 3D product and/or section of the printing volume PV. Material layers may be formed having a second thickness T2. The second thickness T2 is selected to be a multiple of an integer and the first thickness of the reference layer.

It should be noted that the thicknesses of the material layers 45 and the reference layer 50 in FIG. 4 are not drawn to scale but highly exaggerated for the purpose of clarity, and that in order to have a 3D product resembling a wrench, hammer or screw driver, the material layers should be thinner. In FIG. 4 the thickness $T_r$ of the reference layer 50 may for example be selected to be 0.5 mm. The thickness of the applied material layers 45 are thus selected so as to be a multiple of 0.5 mm and an integer. The integer in the shown example is selected to be 3 as can be gleaned by the dashed and dotted lines within the brackets referred to as T2. The integer may be from 1, 2, 3, 4, 5, 6, 7, 8, 9, 10 or more, preferably 1-10, more preferably within the range of 1-10 000, or 1-5000, or 1-1000, or 1-100. In an embodiment, the integer is >1. The integer 1 may thus be excluded, or in other words, in an embodiment the integer may be 2, 3, 4, 5, 6, 7, 8, 9, 10 or more, preferably within the range of 2-10, or 2-10 000, or 2-5000, or 2-1000, or 2-100. By using a lowest common denominator, i.e. the reference layer, when selecting the thickness of the material layers in the batch, 3D products may easily be manufactured, faster and at lower costs. Just as a matter of example, it is possible to manufacture two or more 3D products of equal or different size, but having different resolution, i.e. with different material layer thickness. It is even possible to have different resolution, i.e. material layer thickness, within one single 3D product.

In FIG. 4 some of the wrenches 41' are printed using the thickness of the reference layer $T_r$, while one wrench 41" is printed using the lower resolution using material layers having the thickness T2 as can be gleaned by the four brackets T2. A portion of a 'standing' wrench 41''' will also be printed using the lower resolution, together with the hammer 42 and the screw drivers 43. Just as a matter of example, the thickness $T_r$ may be the thinnest material layer thickness which the device is able to apply or form using a levelling unit. However, it may be advantageous that the reference layer is not the thinnest material layer which the device is able to apply. Hence in some embodiments, the thickness of the reference layer is selected to be larger than the thinnest material layer which the device is able to apply or form using a levelling unit.

Figure 5:
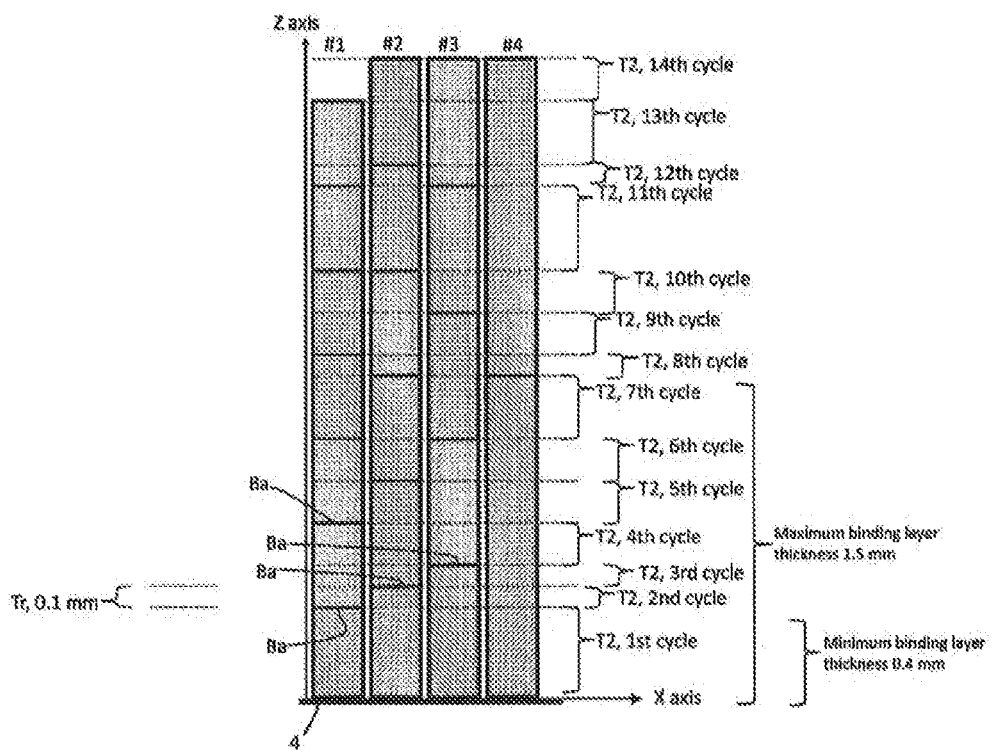
FIG. 5-6 show the cross section of 3D printed products to illustrate method steps according to an embodiment.

FIG. 5 shows a schematic embodiment with a cross sectional view of a printing volume to illustrate a non-limiting embodiment of the present invention. FIG. 5 shows the support 4, four 3D products #1, #2, #3, #4 schematically illustrated. The Z and the X axis are also shown. The cross section of parts of the printing volume and the four objects #1, #2, #3, #4 illustrates how the binding action may be performed and how the material layers may be applied. The material layers formed are illustrated with dashed lines T2 and the applied binding agent Ba is illustrated as a thick line at the selected portion at which it has been applied. The thickness of the selected reference layer is illustrated as $T_r$.

The four 3D products have been printed with different resolution, i.e. layer thickness, in a single batch. The 3D printing device permits a minimum binding layer thickness of 0.4 mm, and the layer applying unit and the material permits layers with a thickness of 0.1 mm. In this case it is the binding agent which is the limiting factor and thus determines the available minimum material layer thickness. The first 3D product #1 have been printed using the integer 4, the second 3D product #2 has been printed using the integer 5, the third 3D product #3 has been printed using the integer 6, and the fourth 3D product #4 has been printed using the integer 15. Hence as can be seen in FIG. 5, 3D product #1 is formed with a material layer thickness of 4·Tr, 3D product #2 is formed with a material layer thickness of 5·Tr, 3D product #3 is formed with a material layer thickness of 6·Tr, and 3D product #4 is formed with a material layer thickness of 15·Tr. The thickness of the reference layer is set to 0.1 mm.

Starting from the support 4 and going upwards along the Z axis.

1$^{st}$ Cycle:

The layer applying unit first applies a material layer having the thickness of four times the reference layer in this case 0.4 mm. Subsequently binding agent Ba is applied on the first 3D product #1 at the selected portion. No binding agent is applied on the other three 3D products.

2$^{nd}$ Cycle

The layer applying unit applies a material layer with the same thickness as the reference layer in this case 0.1 mm. Binding agent Ba is subsequently applied only on the second 3D product #2.

3$^{rd}$ Cycle:

The layer applying unit applies a material layer with the same thickness as the reference layer in this case 0.1 mm. Binding agent Ba is subsequently applied only on the third 3D product #3.

4$^{th}$ Cycle:

The layer applying unit applies a material layer with a thickness of two times the reference layer in this case 0.2 mm. Binding agent Ba is subsequently applied only on the first 3D product #1. As can be noted the first 3D products has two complete bonded material layers at this stage, while e.g. the fourth 3D product #4 does not yet have one complete material layer yet.

5$^{th}$ Cycle:

The layer applying unit applies a material layer with a thickness of two times the reference layer in this case 0.2 mm. Binding agent Ba is subsequently applied only on the second 3D product #2.

6$^{th}$ Cycle:

The layer applying unit applies a material layer with a thickness of two times the reference layer in this case 0.2 mm. Binding agent Ba is subsequently applied on the first 3D product #1 and on the second 3D product #3.

6$^{th}$ Cycle:

The layer applying unit applies a material layer with a thickness of two times the reference layer in this case 0.2 mm. Binding agent Ba is subsequently applied on the first 3D product #1 and on the second 3D product #3.

7$^{th}$ Cycle:

The layer applying unit applies a material layer with a thickness of three times the reference layer in this case 0.3 mm. Binding agent Ba is subsequently applied on the second 3D product #2 and on the fourth 3D product #4.

8$^{th}$ Cycle:

The layer applying unit applies a material layer with a thickness of one time the reference layer in this case 0.1 mm. Binding agent Ba is subsequently applied on the first 3D product #1 only.

9$^{th}$ Cycle:

The layer applying unit applies a material layer with a thickness of two time the reference layer in this case 0.1 mm. Binding agent Ba is subsequently applied on the third 3D product #3 only.

10$^{th}$ Cycle:

The layer applying unit applies a material layer with a thickness of two times the reference layer in this case 0.2 mm. Binding agent Ba is subsequently applied on the first 3D product #1 and on the second 3D product #2.

11$^{th}$ Cycle:

The layer applying unit applies a material layer with a thickness of four times the reference layer in this case 0.4 mm. Binding agent Ba is subsequently applied on the first 3D product #1 and on the third 3D product #3.

12$^{th}$ Cycle:

The layer applying unit applies a material layer with a thickness of one time the reference layer in this case 0.1 mm. Binding agent Ba is subsequently applied on the second 3D product #2 only.

13th Cycle:

In the subsequent cycle; the layer applying unit applies a material layer with a thickness of three times the reference layer in this case 0.3 mm. Binding agent Ba is subsequently applied on the first 3D product #1 only.

14th cycle:

The layer applying unit applies a material layer with a thickness of two times the reference layer in this case 0.2 mm. Binding agent Ba is subsequently applied on the second 3D product #2, the third 3D product #3 and the fourth 3D product #4. The first 3D product #1 now has seven complete and bonded material layers.

The second 3D product #2 now has six complete and bonded material layers.

The third 3D product #3 now has five complete and bonded material layers.

The fourth 3D product #4 now has two complete and bonded material layers.

Figure 6:
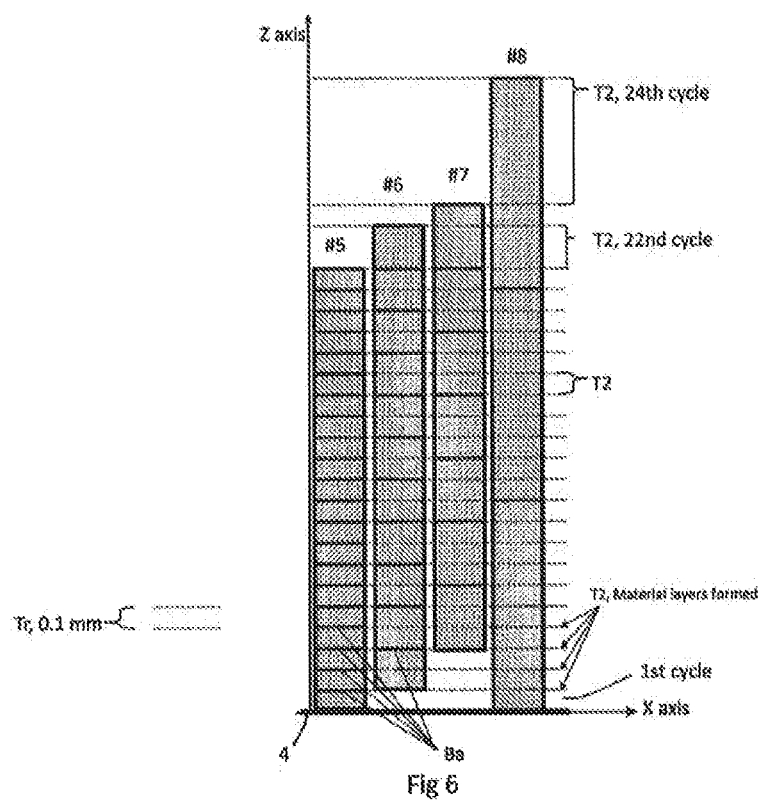

FIG. 6 shows a schematic embodiment with a cross sectional view of a printing volume to illustrate a non-limiting embodiment of the present invention. FIG. 5 shows the support 4, four 3D products #5, #6, #7, #8 schematically illustrated. The Z and the X axis are also shown. The cross section of parts of the printing volume and the four 3D products #5, #6, #7, #8 illustrates how the binding action may be performed and how the material layers may be applied. The material layers formed are illustrated with dashed lines T2 and the applied binding agent Ba is illustrated as a thick line at the selected portion at which it has been applied. In FIG. 6, only some of the material layers formed and only some of the applied binding agent Ba are indicated for the sake of clarity. The thickness of the selected reference layer is illustrated as $T_r$. Following the method disclosed herein, a plurality of 3D products may thus be printing having different resolution but in one single batch. The four 3D products have been printed with different resolution, i.e. layer thickness, in a single batch. The 3D printing device in the shown embodiment permits a minimum binding layer thickness of 0.1 mm, and the layer applying unit and the material permits layers with a thickness of 0.1 mm.

In FIG. 6, the 3D product #5 has an integer of 1, the 3D product #6 has an integer of 2, the 3D product #6 has an integer of 3 and the 3D product #8 has an integer of 10. As can be noticed, for the first 21 cycles (again counting from the support 4 on the Z axis), material layers having the same thickness as the reference layer Tr is formed. At the 22nd cycle a material layer is formed with a thickness of twice the size of the reference layer, i.e. the integer 2 is applied at that stage as this is the first time that this resolution may be applied. At the 24th cycle the last 3D product can be finished by a finalizing material layer having a thickness of 6 times the reference layer.

It should be noted that with respect to both FIGS. 5 and 6 that the figures illustrates where the binding agent is applied during the cycle, and not how the binding agent penetrates the material layers. The binding agent may saturate each individual material layer, or may penetrate into the preceding layer dependent on how much binding agent that is applied.

Example 1

Figure 7:
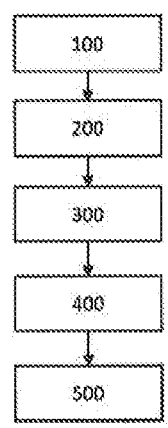
FIGS. 7-9 show schematic process diagrams illustrating optional method steps.

FIG. 7 shows a schematic process diagram illustrating an embodiment of the method according to the present disclosure. In this case, the device uses glass beads as bulk material and a hot melt adhesive as binding agent. The glass beads have an average particle size of 0.05 mm.

At step 100, a computer forming a control unit comprising a display unit for manufacturing one or more 3D products in one batch by means of additive manufacturing using a layer-by-layer technique is loaded with 3D modelling data for a plurality of 3D products, in this case hammer, a screw driver and a wrench.

However, the operator realizes that it is unnecessary to manufacture the 3D products using the highest possible resolution. The operator further has the intention to evaluate different properties of the 3D products printed, such as tensional and torsional strength.

At step 200, the operator sets the thickness $T_r$ of a reference layer. In this case the thickness is set to 0.3 mm.

At step 300, a suitable resolution on the selected 3D products is determined by selecting suitable integer(s) preferably for each 3D model. It should be noted that each 3D model may come with a pre-set integer. The hammer is selected to be made of material layers each having a thickness of 5 times the reference layer, i.e. 5×0.3 mm=1.5 mm. The screw driver is selected to be made with material layers each having a thickness of 3 times the reference layer, i.e. 3×0.3 mm=0.9 mm. The wrench is selected to be made with material layers each having a thickness of 1 times the reference layer, i.e. 1×0.3 mm=0.3 mm.

At step 400, the manufacturing order of the 3D products is determined. The 3D models are positioned in the available printing volume so as to determine when and in which order they should be manufactured. The easiest way to do this is to separate the three 3D products with respect to the Z axis (as shown in FIG. 4 for example) so that they are not arranged in the same plane defined by the Y-X axes. For the purpose of this example, order along the Z axis are selected to be; firstly the hammer; secondly the screw driver and thirdly the wrench.

At step 500, the data is converted to device readable data. The data formed by the above input and terms to the 3D models may be sent to the device control unit which translates the input data to readable data containing instructions for the device. The device is now ready for manufacturing the selected 3D products. Optionally, the data may be converted to device readable data before being forwarded to the device. A set of integers may be formed which are connected to the 3D models and their positions in the printing volume. The set of integers governs how the layer applying unit will form the material layers so that the resolution of the 3D products corresponds to the selected resolution defined by the integers selected. In general terms, the position of the 3D models may be automatically positioned such that a minimum amount of binding actions are required, i.e. a minimum amount of repetitions by the layer bonding unit is required. In general terms, the method may thus comprise that the control unit of the 3D printing device determines a set of integers which sets the thickness of each material layer to be formed.

During manufacturing, the layer applying unit repeatedly applies material layers having a thickness of 0.01 mm across the available printing volume, i.e. the plane defined by the Y-X axes, while the layer bonding unit repeatedly applies binding agent in a pattern corresponding to the specific slice of the 3D models. However, instead of applying binding agent subsequently after each material layers has been applied, i.e. every cycle, the layer bonding unit initially applies binding agent every 5th cycle to print the hammer. Similarly when the screw driver is printed, the layer bonding unit applies binding agent every $3^{rd}$ cycle and when the wrench is printed, the layer bonding unit applies binding agent every cycle.

Example 2

Figure 8:
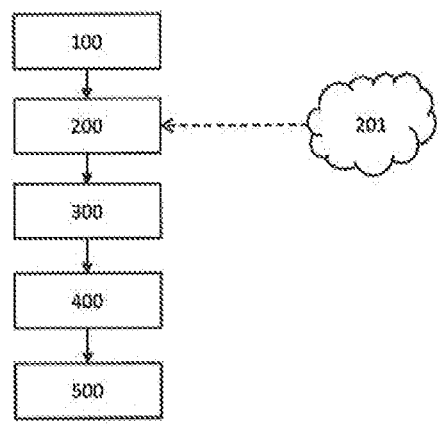

FIG. 8 shows a schematic process diagram illustrating a second embodiment of the method according to the present disclosure. In this case, the device uses wood powder as bulk material and a wood adhesive as binding agent. The wood powder has an average particle size of 0.2 mm.

At step 100 a computer forming the display unit for manufacturing one or more 3D products in one batch by means of additive manufacturing using a layer-by-layer technique is loaded with 3D modelling data for a plurality of 3D products, in this case hammer, a screw driver and a wrench.

At step 200 a stored thickness value for the reference layer is retrieved from a storage unit. The stored thickness value may be set once and thereafter stored in a storage device such as a hard drive on computer. Just as a matter of example, it may optionally be stored and retrieved from a cloud based storage server. The stored thickness value of the reference layer is in this case 0.5 mm.

At step 300 a suitable resolution on the selected 3D products is determined. The hammer is selected to be made with material layers having a thickness of 2 times the reference layer, i.e. 2×0.5 mm=1.0 mm. The screw driver is selected to be made with material layers having a thickness of 3 times the reference layer, i.e. 3×0.5 mm=1.5 mm. The wrench is selected to be made with material layers having a thickness of 1 times the reference layer, i.e. 1×0.5 mm=0.5 mm.

At step 400 the manufacturing order of the 3D products are determined. The 3D models are positioned in the available printing volume so as to determine when and in which order they should be manufactured. In this case the operator intends to save the amount of bulk material used and to speed up the manufacturing time by reducing the amount of cycles for the layer applying unit. The 3D models are selected to share a plane defined by the Y-X axes. The 3D products are thus arranged substantially at the same position with respect to the Y axis, diversions due to the shape of the 3D may of course occur. The 3D models are however separated with respect to the Y and/or the X axis. For the purpose of this example, the order along the Y axis are selected to be; firstly the hammer; secondly the screw driver and thirdly the wrench.

The data is thereafter sent to the device control unit which translates the input data to readable data containing instructions for the device. The 3D products can thereafter automatically be manufactured.

During manufacturing, the layer applying unit repeatedly applies material layers having a thickness of 0.5 mm across the available printing volume, i.e. the plane defined by the Y-X axes, while the layer bonding unit repeatedly applies binding agent in a pattern corresponding to the specific slice of the 3D models or binds the layer in any other suitable way. In this case, the application of binding agent is controlled so that the correct amount of cycles of material layers are achieved for the specific 3D model. In this specific case, after each cycle the layer applying unit has applied a material layer having the thickness of the reference layer, the layer bonding unit applies binding agent every $2^{nd}$ cycle on the selected area of the hammer. Similarly the layer bonding unit applies binding agent every $3^{rd}$ cycle on the selected area of the screw driver and the layer bonding unit applies binding agent every cycle on the selected area of the wrench. This may be controlled by selectively opening and closing the valves jetting the binding agent from the layer bonding unit.

Figure 9:
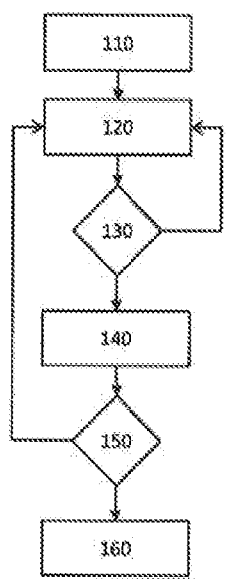

In general terms, and with reference to FIG. 9, a method may comprise one or more of the following steps; at step 110 the control unit process the readable input data derived from the 3D models.

At step 120 the layer applying unit applies one or more bulk material layers, e.g. of particulate material, such that a material layer having the thickness of a reference layer is formed multiplied by an integer and an optional levelling step may be performed using a levelling unit.

At step 130 the control unit check if the readable input data demands that binding agent is to be deposited onto selected surfaces of the previously laid material layer based on the set integer for the 3D models and the relative positions of the 3D models in the printing volume with respect to the X, Y, and Z axes.

If yes, at step 140, binding agent is applied on the selected surfaces.

If no, return to 120, the layer applying unit applies another material layer.

At step 150, the control unit check to see if additional material layers are required. If yes, return to 120.

If no, at step 160, the procedure is terminated and optional post-treatment and actions may be performed such as removing access material, emptying the print volume, performing cleaning and service procedures etc.

Bulk Material

Bulk material is herein meant any material which may be used to form a 3D product by performing a binding action on the bulk material. Preferably the bulk material is a particulate material. The particulate material may be inert particulate material or reactant particulate material. A material layer may comprise one or more layers of bulk material.

Examples of inert particulate material may be selected from metals, inert polymers, inert salts, inert organic materials or inert ceramics, or combinations thereof.

Examples of metals include aluminium, steel, titanium, iron, alloys, or the like.

Examples of inert polymers include poly (methyl methacrylate), polystyrene, polyamide, polyester, a latex, polyethylene, polypropylene, polyurethane, polyvinyl chloride, polyvinyl acetate, cross-linked polyvinyl pyrrolidone, hydrophilic polyurethane, poly (ethylene terephthalate), thermoplastic urethane, styrene-acrylonitrile copolymer, thermoplastic polyolefin, an epoxy-based polymer, polyether, polyamine, a polyacid, a polycarbonate, a vinyl polymer, an aromatic polyamide, a diene polymer, poly (phenylene oxide), polysiloxane, polynorbornene, polyisoprene, a polyphenylene ether, styrene-butadiene block copolymer, acrylonitrile-butadiene-styrene, high impact polystyrene and copolymers thereof.

Examples of inert salts include sodium carbonate, sodium bicarbonate, sodium borate, sodium chloride, sodium sulfate, potassium sulfate, potassium chloride, magnesium sulfate, magnesium chloride, potassium aluminum sulfate, sodium polyphosphate, sodium acetate, hydrous calcium sulfate, calcium phosphate, sodium silicate, and hydrated lime (Ca(OH)2).

Examples of inert organic materials include starch, cellulose fibers, wood powder, wax, resin, bone, protein, carbohydrates, sugars, textile fibers and dietary fibers.

Examples of inert ceramics include gypsum, limestone, clay, aluminum oxide, aluminum silicate, calcium silicate, silicon dioxide, titanium dioxide, glass, iron oxide, zinc oxide, magnetite, aluminum hydroxide, magnesium oxide, calcium phosphate, zirconium silicate, silicon carbide, boron nitride, boron carbide and borosilicate.

Wood Powder

A preferred bulk material may be wood powder. The expression wood powder as used herein refers to a powder made of a wood material. Different tree species, soft wood or hard wood, such as pine, spruce, birch, larch or others, and different forms of wood originating from branches, trunks, stumps, roots of trees, or in the form of wood waste, such as recycled wood waste, can be used as a starting material for producing the wood powder. Examples of suitable wood materials are wood chips originating from machining of homogenous wood, such as sawdust, cutter shavings, or the like. Wood powder will thus include the same substances as the initial wood does such as lignin, pectin and ash.

In comparison to wood powder made from wood material, cellulose or cellulose fibers may be derived from wood material but have been treated in a number of process steps, and thus represents another kind of material. A cellulose fiber is thus a more refined and elegant material and in some aspects lack substances that wood powder would include. Just as a matter of example, cellulose fibers may be natural occurring fibers such as cotton fibers or linen fibers, manufactured fibers from e.g. plants which have been processed into pulp. Examples of plants are crops, wood, leaves or the like. Rayon or viscose fibers are examples of manufactured cellulose fibers.

The use of a wood powder as a bulk material may be advantageous since wood powder can be produced at a low cost, from an easily accessible raw material (wood). The usage of wood powder may even imply that material considered as waste material becomes useful. Furthermore, wood powder is biodegradable and can be used to manufacture biodegradable and thereby environmentally friendly 3D products.

Size of Particulate Matter

The particles of the particulate material such as powder e.g. wood powder, can exhibit different shapes and sizes. The particle size can be from relatively small, so that the powder obtains a flour-like consistency, to relatively large, implying that the individual particles can be distinguished at a visual inspection. Advantageously, the particles of a given powder are substantially of the same size in order to obtain a uniform quality of the final product.

For many products, a particle size in the size interval 0.001-5 mm, and preferably of the order of 0.01-2 mm, can be used when forming the material layers. If, for example, a particle size of 1 mm is chosen, it can be ensured by means of filtration, sometimes referred to as sieve analysis, that the particles in one and the same powder has a size which does not exceed, for example, 1.2 mm, and a size which does not fall below, for example, 0.8 mm.

The size of the individual particulate matter may be as small as atom size, or nano size. Just as a matter of example, atom by atom material layers may be formed using molecular beam epitaxy (MBE) which allows for the vertical stacking of individual atomic layers i.e. the Z-axis, in combination with scanning probe lithography, which uses an extremely sharp tip to move and place individual atoms in a lateral direction, i.e. the X- and Y-axes. A Laser particle sizer Analysette 22 NanoTec, by Fritsch, may be used. Such device generally has measuring range of 0.01-2100 µm. Standard ISO 13320. Following theory Fraunhofer, Mie. Fraunhofer theory for larger particles when their exact optical parameters are unknown and Mie theory for the smallest particles with known optical parameters. It is possible to select both theories in a FRITSCH MaS control software.

Other particle size measurements methods which may be used to determine a particle size are sieve analysis, sedimentation, image particle analysis, microscope counting to mention a few.

Binding Actions

Suitable binding actions may be to add binding agent, to add one or more chemical reactants to form a binding agent on or in the material layer, heat treatment to e.g. melt portions of the material layer such that the material layer is bonded. Other binding actions may be radiation treatment, electromagnetic radiation, electron beam, light treatment or combinations thereof.

Binding Agent

Different types of binding agents may be used. The useful binding agents have in common that they are capable of bonding together the powder, or particles, in the bulk material so that a desired strength of the 3D product can be achieved. The binding agent can be water-based, but the binding agent is suitably water resistant. Whether the binding agent should be water resistant or not, however, depends on the 3D product which is to be manufactured and possible post-treatments of the product. One suitable binding agent is wood glue, but also a hot melt adhesive, for example a plastic-based one, which is heated during application could be used. Most wood glues which are present on the market have the advantages of being relatively cost efficient and easy to handle, environmentally friendly and particularly suited for bonding wood materials. Non-limiting examples of glue are Polyvinyl acetate (PVA) glue, animal glue such as hide glue, Polyurethane glue, Urea-formaldehyde resin adhesives, Resorcinol-formaldehyde resin glue, Cyanoacrylate glue preferably with additive for delayed hardening time.

The binding agent can also be applied as two or more individual components which together form a binding agent, e.g. via a chemical reaction between the two or more components such as epoxy resin and hardener. The binding agent may be formed on the material layer itself or before being applied onto the material layer.

The concentration or dilution of the binding agent (water content if a water-based binding agent is concerned) can be varied. Thereby, also the moisture content of the used bulk material has a certain importance, since the total amount of moisture originating from the powder and the binding agent has to be capable of at least wetting the material to the desired extent in order to enable bonding of selected portions of the bulk material layers. The moisture content of the bulk material should also be adapted in order to give the bulk material properties making the bulk material easy to work when being laid out in layers. The binding agent may be applied such that each layer is saturated with binding agent, or such that the binding agent sinks into the preceding material layer, or even into preceding material layers. In the latter case, binding agent is applied such that the material layer is bonded together but not saturated. Instead binding agent may be applied onto a subsequently applied material layer but yet still penetrate into the preceding one or more material layers. Binding agent may penetrate into two or more such as 2-6 previous material layers. This will provide a 3d product which is continuous in terms of that no, or substantially no, material layers may be identified should the 3D product be cut open and inspected.

Additives

In addition to the particulate material constituting the base of the material such as wood powder, and, accordingly, the base of the finished 3D product, it is also possible to add small quantities of other substances/materials to the binding agent and/or to the material layer in order to obtain specific properties of the 3D product formed from the particulate material. The particulate material, such as wood powder, should form at least 50%, 51% or more, 60% or more, 70% or more, 80% or more, 90% or more, 95% or more of the material layer. Preferably, different substances can be added to the binding agent and/or the material layer, e.g. as a mixture with the particulate material.

One example of such an additive is colouring agent, colouring pigment, or the like, in order to give the end product a certain colour. By means of choosing different colours of the binding agent for different layers of the product, the finished product can obtain different colours on different visible surfaces.

Other additives are reinforcing elements such as reinforcing strings, e.g. nylon strings.

One or more flame retardants may further be added. Flame retardants are generally divided into three groups; minerals, Organohalogen compounds and Organophosphorus compounds. Examples of minerals are; magnesium hydroxide (MDH), aluminium hydroxide (ATH), red phosphorus, boron compounds, huntite and hydromagnesite, and various hydrates. Examples of organohalogen compounds are organochlorines such as chlorendic acid derivatives and chlorinated paraffins; polymeric brominated compounds such as brominated polystyrenes, brominated carbonate oligomers (BCOs), brominated epoxy oligomers (BEOs), tetrabromophthalic anyhydride, tetrabromobisphenol A (TBBPA) and hexabromocyclododecane (HBCD), organobromines such as decabromodiphenyl ether (decaBDE), decabromodiphenyl ethane (a replacement for decaBDE).

A flame retardant synergist may further be added to improve the efficiency of the flame retardant, such as antimony trioxide, pentoxide and sodium antimonate.

Examples of organophosphorus compounds are phosphonates such as dimethyl methylphosphonate (DMMP); and phosphinates such as aluminium diethyl phosphinate, triphenyl phosphate (TPP), resorcinol bis(diphenylphosphate) (RDP), bisphenol A diphenyl phosphate (BADP), and tricresyl phosphate (TCP).

Flame retardants comprising phosphorus and a halogen may also be used such as and chlorinated organophosphates such as tris(1,3-dichloro-2-propyl)phosphate (chlorinated tris or TDCPP) and tetrakis(2-chlorethyl)dichloroisopentyl-diphosphate (V6), tris(2,3-5 dibromopropyl) phosphate (brominated tris).

The invention claimed is:

1. A method for manufacturing a batch of one or more 3D products by additive manufacturing using a layer-by-layer technique, said method comprising the steps of:

a) setting a reference layer thickness in a control unit for a 3D printing device;
b) setting a first material layer thickness, said first material layer thickness being set as a multiple of a first integer and said reference layer thickness;
c) forming a material layer having said first material layer thickness;
d) performing a binding action on said material layer having said first material layer thickness;
   wherein steps (c) and (d) are performed two or more times, thereby forming a first zone of bonded material layers in said batch, said bonded material layers in said first zone of bonded material layers being formed from said material layers having said first material thickness;
e) setting a second material layer thickness, said second material layer thickness being set as a multiple of a second integer and said reference layer thickness, said second integer being different from said first integer;
f) forming a material layer having said second material layer thickness; and
g) performing a binding action on said material layer having said second material layer thickness;
   wherein steps (f) and (g) are performed two or more times, thereby forming a second zone of bonded material layers in said batch, said bonded material layers in said second zone being formed from said material layers having said second material thickness, said material layer thickness of said second zone being different from said material layer thickness of said first zone, said first zone of bonded material layers being arranged side-by-side with said second zone of bonded material layers in said batch of one or more 3D products and sharing a same X-Y plane with said second zone of bonded material layers.

2. The method according to claim 1, wherein said first integer is within the range of 1-10 000 and wherein said second integer is within the range of 1-10 000.

3. The method according to claim 1, wherein said batch contains at least two 3D products, a first 3D product in said batch being at least partly formed by material layers having said first material layer thickness, and a second 3D product in said batch being at least partly formed by material layers having a second material layer thickness, said first material layer thickness being different from said second material layer thickness.

4. The method according to claim 1, wherein said reference layer thickness is within the range of from 0.05 to 2.0 mm.

5. The method according to claim 1, wherein said material layer is formed by applying one or more layers of bulk material.

6. The method according to claim 1, wherein said method comprises printing at least a first and a second 3D product in a single batch.

7. The method according to claim 1, whereby said binding action is performed by heat treatment, radiation treatment, light treatment, application of binding agent, application of chemical reactant, or combinations thereof.

8. The method according to claim 1, wherein the reference layer thickness in step (a) is set as a memorized value.

9. The method according to claim 1, wherein said material layer having said first material layer thickness and said material layer having said second material layer thickness are formed within one 3D product.

10. The method according to claim 1, wherein said material layer having said first material layer thickness and said material layer having said second material layer thickness are formed within in at least two different 3D products.

11. The method according to claim 1, wherein said material layers are formed using a particulate material.

12. The method according to claim 1, wherein in step (c) forming of said material layer comprises levelling out said material layer, said first material layer thickness being determined after said material layer has been levelled out.

13. The method according to claim 12, wherein said material layer is levelled out using a fixed blade and/or a rotating element.

14. The method according to claim 1, whereby a set of integers are formed, said set of integers defining the material layer thickness to be formed during printing of the 3D products.

15. The method according to claim 1, wherein said one or more 3D products is one 3D product, and said first zone of bonded material layers is arranged side-by-side with said second zone of bonded material layers in said one 3D product.

16. The method according to claim 1, wherein said one or more 3D products is two or more 3D products, and said first zone of bonded material layers is arranged side-by-side with said second zone of bonded material layers in said two or more 3D products.

* * * * *